United States Patent
Imura

(10) Patent No.: US 7,031,739 B1
(45) Date of Patent: Apr. 18, 2006

(54) CODE DIVISION MULTIPLE ACCESS COMMUNICATION APPARATUS AND METHOD THEREOF

(75) Inventor: Minoru Imura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,163

(22) Filed: Nov. 15, 1999

(30) Foreign Application Priority Data

Nov. 13, 1998 (JP) ............................. 10/323810

(51) Int. Cl.
*H04B 7/00* (2006.01)
(52) U.S. Cl. .......................... 455/522; 375/135
(58) Field of Classification Search ............... 370/335, 370/342, 252; 375/135, 136; 455/522
See application file for complete search history.

(56) References Cited

U.S. PATENT DOCUMENTS

| | | | |
|---|---|---|---|
| 4,901,307 A | 2/1990 | Gilhousen et al. | 370/342 |
| 5,056,109 A | 10/1991 | Gilhousen et al. | 370/320 |
| 5,930,242 A | 7/1999 | Mimura | 370/331 |
| 6,028,852 A | 2/2000 | Miya et al. | |
| 6,097,711 A | 8/2000 | Okawa et al. | |
| 6,173,005 B1 * | 1/2001 | Kotzin et al. | 375/146 X |
| 6,222,873 B1 * | 4/2001 | Bang et al. | 375/146 |
| 6,396,868 B1 * | 5/2002 | Yoon et al. | 375/146 |
| 6,493,330 B1 * | 12/2002 | Miya et al. | 370/335 |

FOREIGN PATENT DOCUMENTS

| | | |
|---|---|---|
| CN | 1165460 | 11/1997 |
| CN | 1171676 | 1/1998 |

OTHER PUBLICATIONS

British Report dated Apr. 27, 2000.

* cited by examiner

*Primary Examiner*—Edan Orgad
*Assistant Examiner*—Philip J. Sobutka
(74) *Attorney, Agent, or Firm*—McGinn IP Law Group, PLLC

(57) ABSTRACT

A CDMA communication apparatus according to the present invention is constructed of a plurality of spreading units, an adding unit, a coefficient setting unit, a multiplying unit, and a transmission unit. The plural spreading units spread a plurality of transmission data containing a pilot signal and a data signal by using different codes from each other to output spread signals. The adding unit adds a plurality of spread signals derived from the respective spreading units to each other so as to output an additional signal. The coefficient setting unit outputs a coefficient set in such a manner that transmission power of the pilot signal is made substantially coincident with transmission power of the data signal. The multiplying unit multiplies, in particular, a pilot signal portion contained in the addition signal outputted from the adding unit by the coefficient outputted from the coefficient setting unit. The transmission unit transmits the signal outputted from the multiplying unit.

23 Claims, 14 Drawing Sheets

51 TRANSMISSION DATA

54 TRANSMISSION DATA

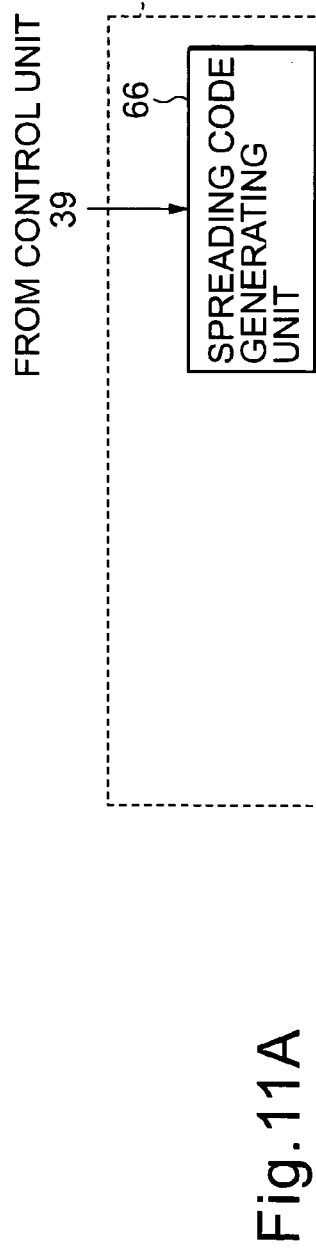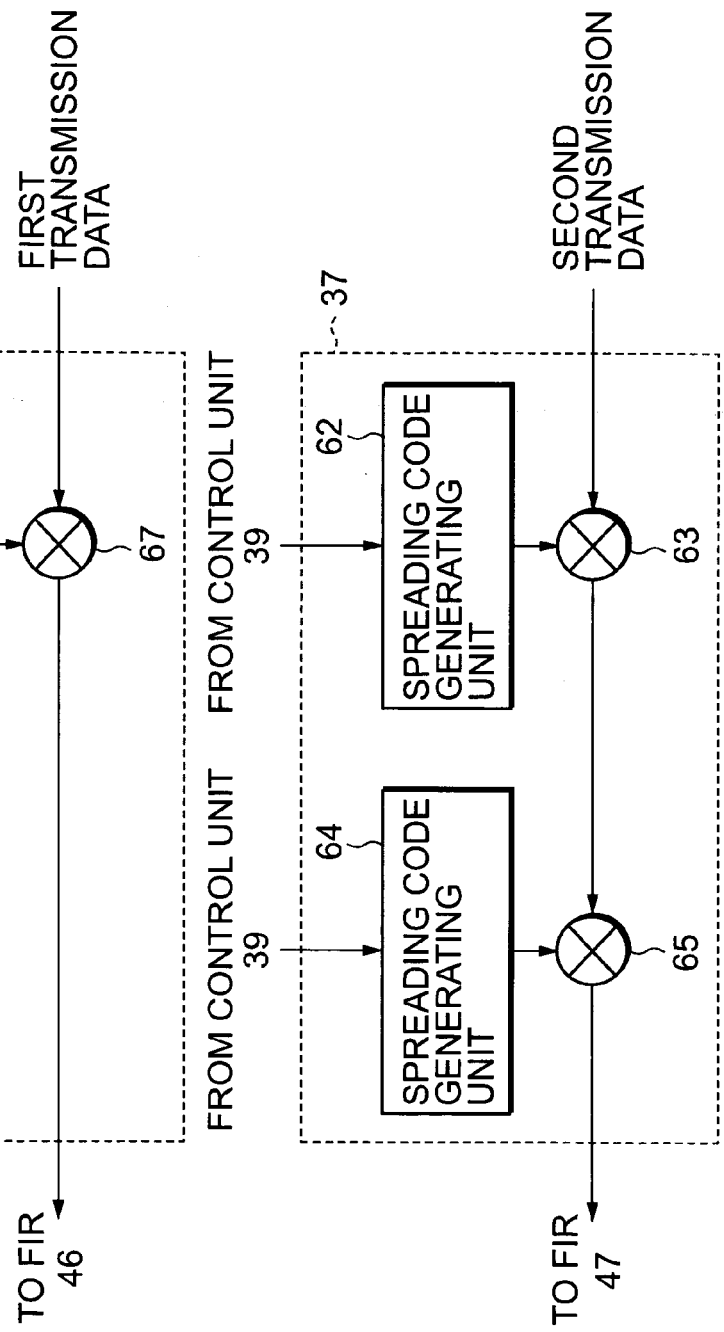
Fig. 11A
Fig. 11B

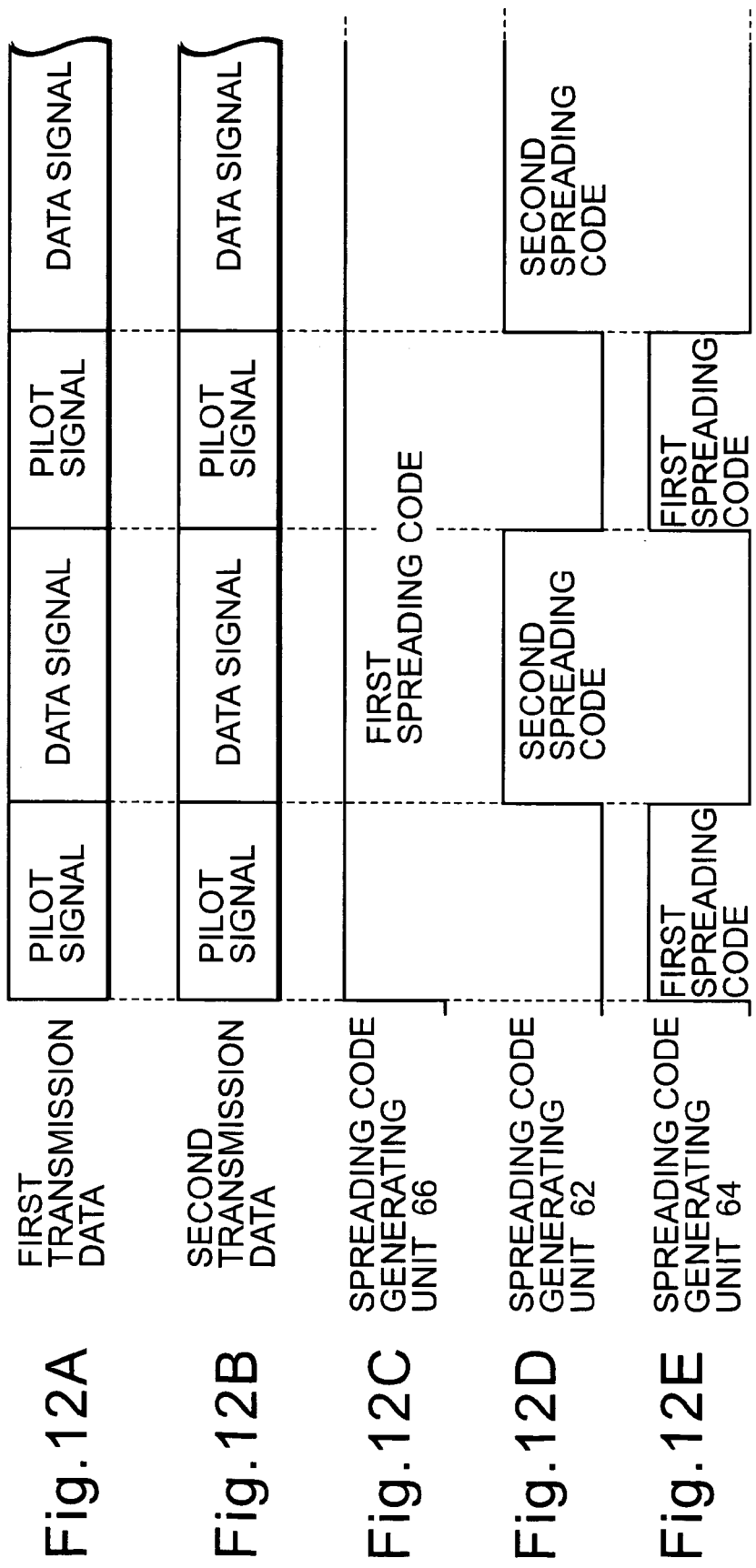

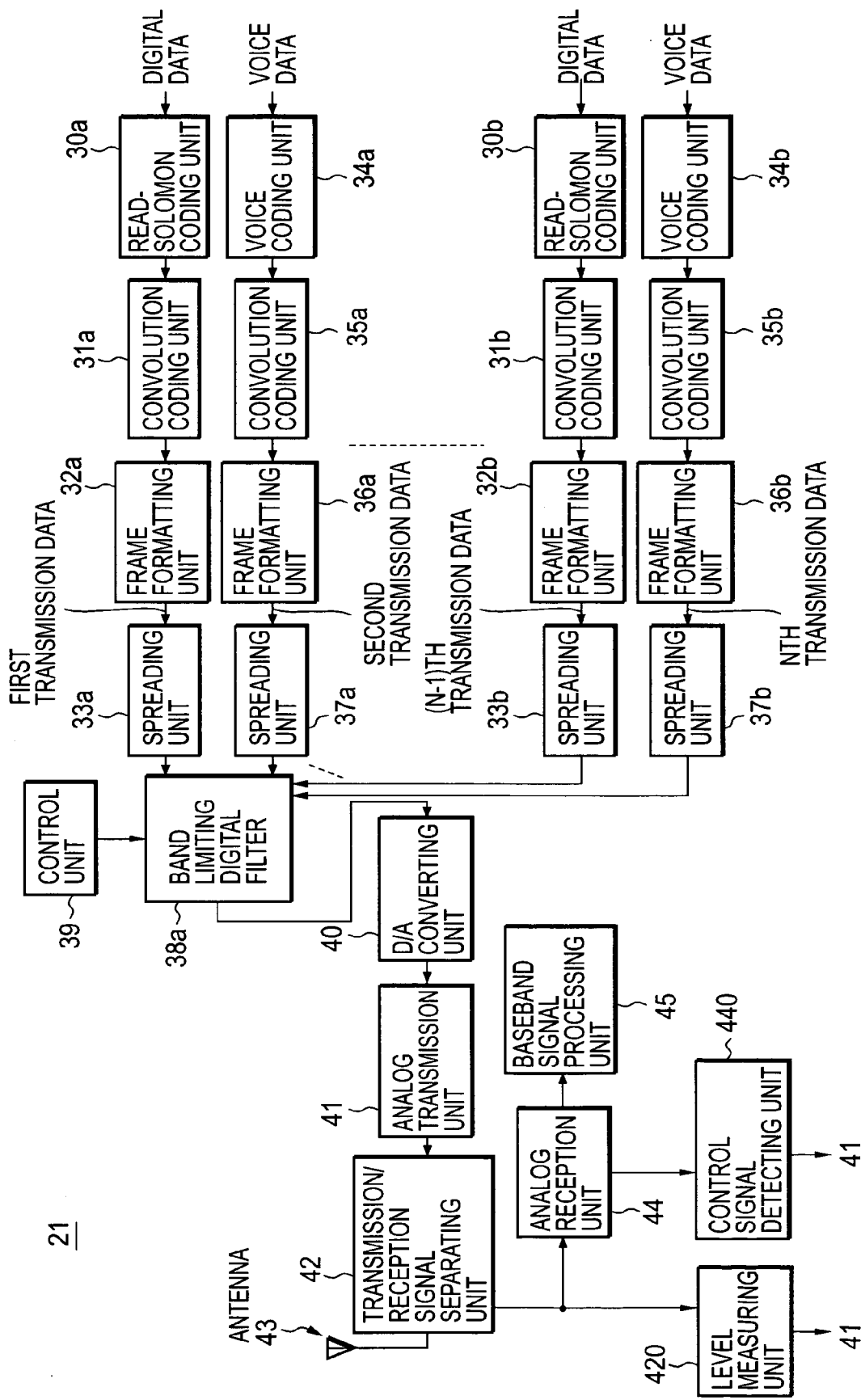

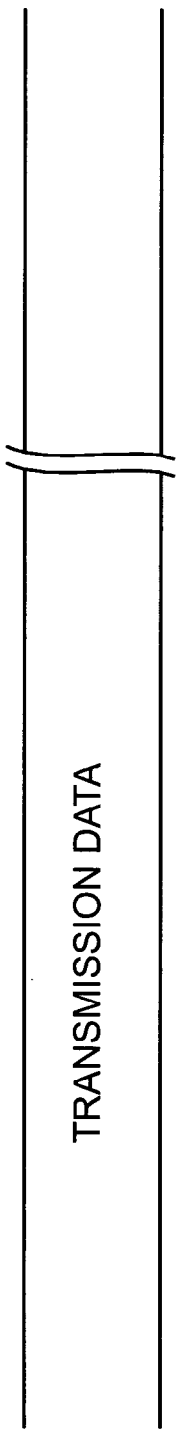
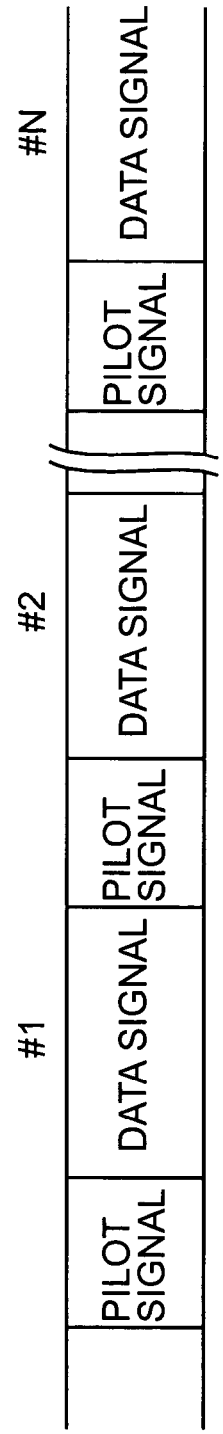
Fig. 15A
Fig. 15B

CODE DIVISION MULTIPLE ACCESS COMMUNICATION APPARATUS AND METHOD THEREOF

BACKGROUND OF THE INVENTION

1. Field of the Invention

The present invention generally relates to a CDMA (Code Division Multiple Access) communication apparatus and a CDMA communication method. More specifically, the present invention is directed to such a CDMA communication apparatus and a CDMA communication method, which suitably use a multi-code.

2. Description of the Related Art

Conventionally, communication systems in which the CDMA system is used are known in the telecommunication field, such as disclosed in U.S. Pat. No. 4,901,307. In this CDMA communication system, data that is transmitted for every user is spread by employing different spreading codes from each other, and then the spread data is transmitted to each user. Since mutual correlations among these different spreading codes are made small, the data transmitted from the respective users can be discriminated from each other when the spreading codes are inverse-spread.

In accordance with such a CDMA communication system, since the data of a plurality of users can be transmitted/received substantially at the same time by using the same frequency band, a large number of users can be stored within a limited frequency band.

Also, in such a CDMA communication system, if spreading codes whose mutual correlations are equal to zero are employed, then it is possible to eliminate an adverse influence given to own transmission data caused by transmission data of other user.

However, it is practically difficult to select such spreading codes whose mutual correlations are zero. Thus, the transmission data sent from other user may cause noise when the transmission data from his own station is to be received by the counter station. To suppress such noise levels to minimum levels on the reception side, the transmission power of the transmission data is required to be adjusted on the transmission side in such a manner that the reception power of all of the reception data becomes equal to each other.

For instance, a base station in a mobile communication system performs a transmission power control, namely instructs the respective mobile stations to adjust transmission power thereof in such a manner that reception power of reception signals derived from a plurality of mobile stations under management becomes substantially equal to each other. This transmission power control is carried out based on the reception power of the data received by the base station. This sort of transmission power controlling method for mobile stations is referred to as a "closed loop control".

In the mobile station, not only the transmission power control is carried out in response to such an instruction issued from the base station, but also the transmission power control of the mobile station is carried out based on the reception power of the data received by this mobile station. This sort of transmission power controlling method for mobile stations is called as an "open loop control". The transmission power control method for the mobile stations by way of both the open loop control and the close loop control is disclosed in U.S. Pat. No. 5,056,109.

On the other hand, very recently, CDMA communication systems in which the multi-code is used are developed. In accordance with this CDMA communication system, while a plurality of spreading codes are used in a single mobile station, a plurality of communications can be substantially simultaneously carried out in this single mobile station. That is to say, in the case that a data communication is wanted to be performed while executing the normal voice (speech) communication, since the voice data and the transmission data are spread by using different spreading codes from each other, both the voice data and the transmission data can be substantially simultaneously transmitted without interference that occurred between the voice data and the transmission data. Also, one piece of relative transmission data is subdivided into a plurality of transmission data, and then the subdivided transmission data are spread by employing the different spreading codes from each other, and further the subdivided/spread transmission data are transmitted substantially at the same time. As a result, the transmission speed of the transmission data can be increased.

FIG. 1 is a schematic block diagram for showing a conventional transmitter in which the multi-code is used.

Referring to FIG. 1, this transmitter is arranged by including a spreading unit 1a for spreading first transmission data by a first spreading code which is internally produced; an FIR (Finite Impulse Response) filter 2a for limiting a frequency band of an output signal from the spreading unit 1a to a preselected range; another spreading unit 1b for spreading second transmission data by using a second spreading code which is internally produced; another FIR filter 2b for limiting a frequency band of an output signal from the spreading unit 1b to a predetermined range; an adder for adding an output signal of the FIR filter 2a to an output signal of the FIR filter 2b; a D/A converting unit 4 for converting a digital output signal of the adder 3 into an analog signal; an analog transmission unit 5 for transmitting the analog output signal of the D/A converting unit 4 in the wireless manner; and an antenna 6 for a wireless signal transmission.

Since the first spreading code used in the spreading unit 1a and the second spreading code used in the spreading unit 1b have the small mutual correlations, two different sorts of transmission data, namely the first transmission data and the second transmission data are spread by the respective spreading codes, and then can be substantially simultaneously transmitted.

On the other hand, actual transmission data is mainly constituted of a pilot signal and a data signal. This pilot signal corresponds to a predetermined signal used to establish the synchronization and the like. The data signal is that actually wanted to be transmitted by a user. The pilot signal that constitutes a portion of the transmission data is employed in not only the first transmission data shown in FIG. 1, but also the second transmission data shown in FIG. 1.

As a consequence, considering simple processing operation such as demodulating process on the reception side, both the pilot signal portion contained in the first transmission data and the pilot signal portion contained in the second transmission data are preferably spread by using the same spreading codes for the transmission purpose. As apparent from the foregoing descriptions, the data signal portion of the first transmission data and the data signal portion of the second transmission data are spread by using the different spreading codes for the transmission purpose.

Now, both the first transmission data and the second transmission data, which have been processed by the above-explained spreading process, are added to each other by the adder 3 shown in FIG. 1. In this case, since the pilot signal portion of the first transmission data and the pilot signal portion of the second transmission data are present in-phase condition, the transmission power thereof is accordingly increased. To the contrary, as to the data signal portion, since both the first transmission data and the second transmission data are spread by using the different spreading codes having the small mutual correlations from each other, the transmission power thereof remains in the original transmission power. As a result, the transmission power of the signal transmitted from the analog transmission unit 5 shown in FIG. 1 is increased, namely the transmission power of the pilot signal portion is different from that of the data signal portion. As a result, the below-mentioned problems (1) and (2) will occur.

(1) When a power difference is produced between the transmission power of the pilot signal portion and the transmission power of the data signal portion, the continuously varied power is reached to the reception circuit on the receiver side. Assuming that the adverse influence caused by the transmission path is ignored, as to the electromagnetic wave reached from the mobile station to the base station in the conventional CDMA communication system without using the multi-code, there is no power difference between the pilot signal portion and the data signal portion, namely constant power in an ideal case.

As previously explained, such a CDMA communication system is required to precisely control transmission power so as to transmit signals with proper transmission power to the respective users. To perform this transmission power control, since the pilot signal portion is used, when there is a power difference between this pilot signal portion and this data signal portion, no proper transmission power control can be performed. In other words, even when Eb/N0 corresponding to the convergence value of the transmission power control can be satisfied while transmitting the pilot signal portion, Eb/N0 cannot be satisfied while transmitting the data signal portion. As a result, when the multi-code is used, in such a case that the transmission power of the data signal portion becomes smaller than the transmission power of the pilot signal portion, the desirable reception quality characteristic cannot be obtained on the reception side. Roughly speaking, there is a proportional relationship between the reception quality characteristic and Eb/N0.

(2) While the internal interpolation synchronous detection with employment of the pilot signal is carried out, there is such a problem that the input/output phase difference is produced. This is caused by the input power difference produced in the amplifying stage for the intermediate frequency band and in the amplifying stage for the high frequency band.

Normally, since the transmission data are continued, while the data signal of the present transmission data is sandwiched between the pilot signal of the present transmission data and the pilot signal of the next transmission data, the resultant data is transmitted. Such a phase rotation of the data signal portion sandwiched by the pilot signals in the transmission path must be corrected. As previously explained, when there is such a transmission power difference between the pilot signal portion and the data signal portion, the rotation elements by cause other than the transmission path are involved. Therefore, the processing operation becomes quite complicate.

Now, a detailed description is made of the reason why such a power difference occurs between the pilot signal portion and the data signal portion.

In a CDMA system, a spreading code is selected in view of the following description:

1) many sorts of signals;
2) small mutual correlations capable of discriminating signals from each other;
3) sharp self-correlation characteristics required for establishing synchronization; and
4) a long time period and appearance at random because of secrecies.

In the case that a plurality of communications are realized at the substantially same time by a single mobile station, a plurality of the above-explained spreading codes may be assigned. In this case, a plurality of spreading codes may be assigned to each the data signal portion of a plurality of transmission data on the communication. The phase-shifted codes may be applied instead of a plurality of different spreading codes from each other. To the contrary, one typical spreading code among the plurality of spreading codes may commonly be assigned to the pilot signal portion of a plurality of transmission data, because of the quick processing operation and of simplicity.

In the above-described assignment case, assuming now that "N" pieces of transmission data stream is expressed as Dn(t)=(1, −1), a total power value of the data signal portion is expressed by the following formula (1):

$$\{D1(t)+D2(t)+\ldots+Dn(t)\}^2 = D1(t)^2 + D2(t)^2 + \ldots + DN(t)^2 + 2\times(D1(t)\times D2(t) + D1(t)\times D3(t) + \ldots + Dn-1(t)\times Dn(t))  \quad \text{formula (1)},$$

wherein the "N" and "n" are an integer and "t" is a parameter of time.

Also, the following formula (2) can be satisfied due to the orthogonal characteristic owned by this spreading code:

$$\int D1(t)\times D2(t)\, dt = 0 \quad \text{formula (2)},$$

where the integral range of this formula (2) corresponds to the time period of the spreading code. When the above formula (1) is modified by using the relationship defined by the formula (2), the below-mentioned formula (3) is obtained:

$$\{D1(t)+D2(t)+\ldots+Dn(t)\}^2 = D1(t)^2 + D2(t)^2 + \ldots + Dn(t)^2 = N \quad \text{formula (3)}$$

In other words, the total power value of the data signal portion may become "N" as expressed in the above formula (3), when the "N" pieces of transmission data stream is simultaneously transmitted by multi-code transmission spread manner.

On the other hand, a total power value of the pilot signal portion may become $3^2=9$. That is, since all of the same spreading codes are employed so as to spread the pilot signal portions, in such a multi-code spreading operation that 3 sets of transmission data are transmitted at substantially same time, when the power values are simply added to each other, the pilot signal owns the amplitude value of either "+3" or "−3". In other words, the total power value of the pilot signal portions becomes $N^2$ in the case that N pieces of transmission data are transmitted.

As a result, when the total number N of the transmission data is larger than 1, namely when the transmission data is transmitted by the multi-code spreading manner, such a transmission power difference is produced between the pilot signal portion and the data signal portion.

SUMMARY OF THE INVENTION

An object of the present invention is to provide a transmission apparatus and a transmission method, capable of controlling transmission power under stable condition.

Another object of the present invention is to provide a spread multi-code communication apparatus and a spread multi-code communication method, capable of controlling transmission power even when the multi-code is used.

Furthermore, another object of the present invention is to provide a CDMA communication apparatus and a CDMA communication method, capable of controlling both transmission power of a pilot signal portion and transmission power of a transmission data portion under stable condition in such a case that a plurality of transmission data includes pilot signals and transmission data.

To achieve the above-described objects of the present invention, a communication apparatus wherein transmission data containing a first signal and a second signal different from said first signal is transmitted, the communication apparatus comprises a transmission power controller for controlling at least one of transmission power of the first signal and transmission power of the second signal in such a manner that the transmission power of the first signal is made substantially coincident with the transmission power of the second signal, and a transmitter for transmitting the transmission data containing the first signal and the second signal in the transmission power controlled by the transmission power controller.

To achieve the above-described objects of the present invention, a spread multi-code communication apparatus for transmitting a plurality of transmission data by spreading the plurality of transmission data by employing different codes from each other, the apparatus comprises a plurality of spreading units for spreading the plurality of transmission data by employing the different codes from each other to thereby output spread signals, a synthesizing unit for synthesizing a plurality of spread signals outputted from the respective spreading units with each other to thereby output a synthesized signal, a coefficient output unit for outputting a predetermined coefficient, a multiplying unit for multiplying the synthesized signal outputted from the synthesizing unit by the predetermined coefficient, and a transmitting unit for transmitting a signal outputted from the multiplying unit.

To achieve the above-described objects of the present invention, a CDMA communication apparatus in which with respect to a plurality of transmission data each having a data signal and a pilot signal, the pilot signal is spread by way of a first spreading code which is commonly used to the respective transmission data, the data signal is spread by way of second spreading codes which are different from each other as to the respective transmission data, and all of the spread transmission data are added to each other, whereby the added transmission data is transmitted, the CDMA communication apparatus comprises a transmission power control unit for controlling transmission power of the transmission data in such a manner that transmission power of the pilot signal is made substantially equal to transmission power of the data signal, and a transmission unit for transmitting said transmission data by the transmission power controlled by the transmission power control unit.

To achieve the above-described objects of the present invention, a communication method wherein transmission data containing a first signal and a second signal is transmitted, the method comprises the steps of controlling at least one of transmission power of the first signal and transmission power of the second signal in such a manner that said transmission power of the first signal is made substantially coincident with the transmission power of the second signal, and transmitting the transmission data containing the first signal and the second signal in the controlled transmission power.

To achieve the above-described objects of the present invention, a CDMA communication method in which with respect to a plurality of transmission data each having a data signal and a pilot signal, the pilot signal is spread by way of a first spreading code which is commonly used to the respective transmission data, the data signal is spread by way of second spreading codes which are different from each other as to the respective transmission data, and all of the spread transmission data are added to each other, whereby the added transmission data is transmitted, the method comprises the steps of controlling transmission power of the transmission data in such a manner that transmission power of the pilot signal is made substantially equal to transmission power of the data signal, and transmitting said transmission data by the transmission power controlled by the transmission power control unit.

BRIEF DESCRIPTION OF THE DRAWINGS

These and other objects, features and advantages of this invention will become more fully apparent from the following detailed description taken with the accompanying drawings in which:

FIG. 11A and FIG. 11B are schematic block diagrams for indicating an arrangement of the spreading unit, according to another embodiment of the present invention, shown in FIG. 4;

FIG. 12A to FIG. 12E are timing charts for representing first transmission data and second transmission data, and also for representing generation timing of spreading codes generated by the spreading code generating units shown in FIG. 11A and FIG. 11B;

FIG. 13 is a schematic block diagram for representing a mobile station according to another embodiment of the present invention;

FIG. 15A and FIG. 15B show structural diagrams of signals transmitted by a mobile station according to another embodiment of the present invention.

DETAILED DESCRIPTION OF THE PREFERRED EMBODIMENTS

Referring now to drawings, a CDMA communication apparatus and method, according to a preferred embodiment of the present invention, will be described in detail.

In the below-mentioned embodiment, a description is made of mobile stations in a CDMA mobile communication system, to which the present invention is applied.

CDMA Mobile Communication System

Figure 1:
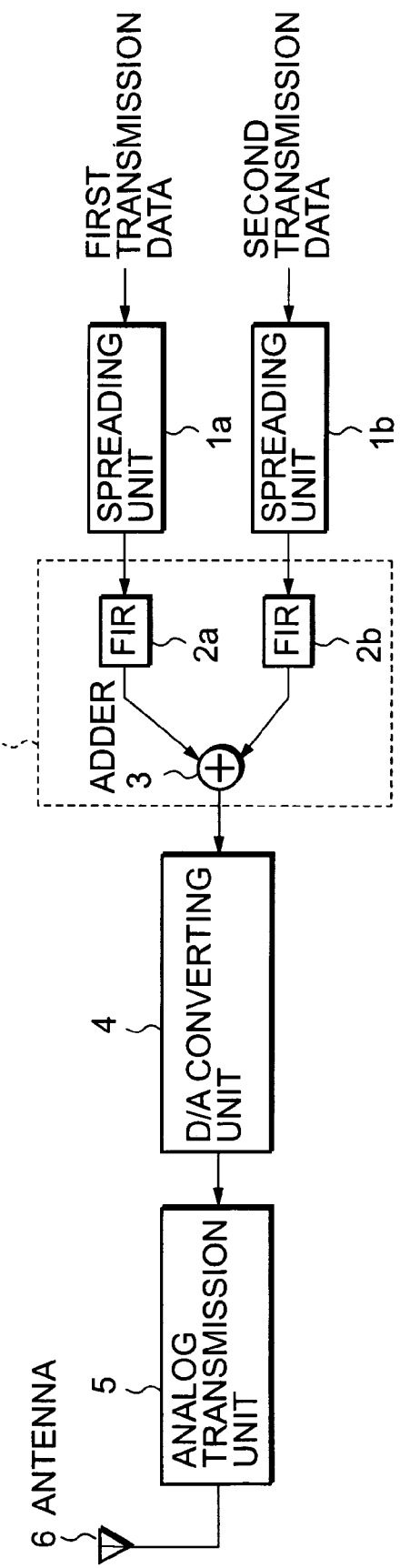
FIG. 1 is a schematic block diagram for showing the conventional transmitter in which the multi-code is used.
Figure 2:
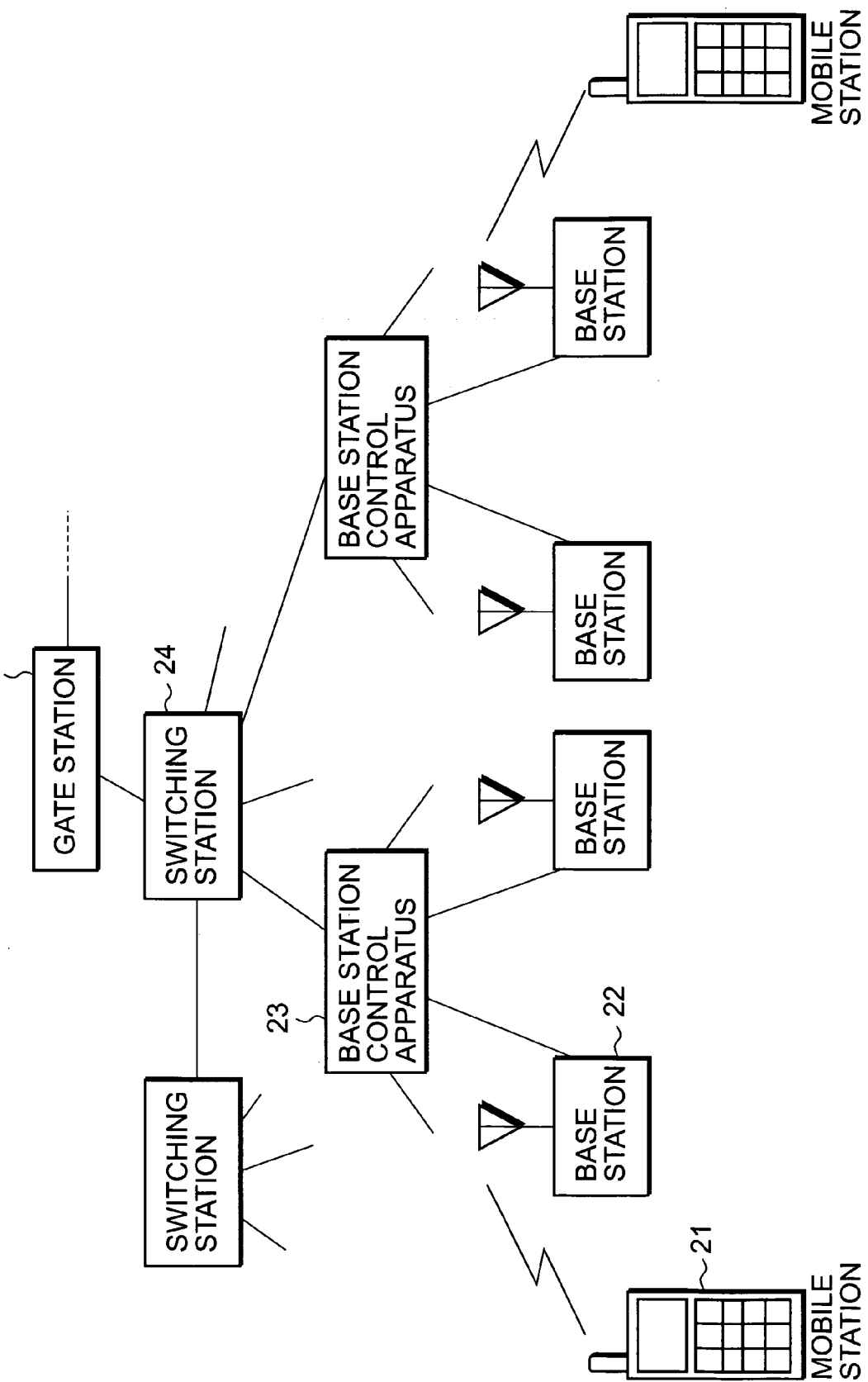
FIG. 2 is a conceptional block diagram for indicating a mobile communication system to which a CDMA communication apparatus according to the present invention is applied.

FIG. 2 is a conceptional block diagram for showing a mobile communication system to which the CDMA communication apparatus according to the present invention is applied.

A base station, a base station control apparatus and a switching station, which constitute a network employed in a mobile communication system, utilize the ATM (Asynchronous Transfer Mode) communication technique and the like because of variations in services provided by this mobile communication system, for instance, multi-media services, and also higher utilization efficiencies of transfer paths which connect each of base stations, a base station control apparatus, and a switching station, for instance, in view of the statistical multiplexing effect.

A mobile station 21 corresponds to such a portable telephone, a portable information processing terminal, or a mobile terminal apparatus realized in combination with these functions. The mobile station 21 communicates with another mobile station, and/or a terminal apparatus connected to another network by the mobile communication system. As to a sort of communications, various sorts of communication manners are available, for example, voice communication and data communication.

Transmission data supplied from the mobile station 21 is transmitted as communication data via a wireless communication line to a base station 22. In the base station 22, the communication data received from the mobile station 21, or communication data received from another mobile station is processed by way of various sorts of data processing operations, or is assembled as an ATM cell. Thereafter, this base station 22 sends the processed communication data to a base station control apparatus 23.

As previously explained, even when the communication data transmitted over the wireless section owns any sorts of data forms such as voice, images, and the like, since the information processed as the ATM cells in the base station is transferred within the network, these communication data may be readily applied to the multi-media communication forms.

In the base station control apparatus 23, the ATM cells received from the base station 23 are routed with respect to each of users, and then the routed ATM cells are transmitted to a switching station 24, and other base stations managed by this base station control apparatus 23. Similar to the base station control apparatus 23, in the switching station 24, the ATM cells received from the base station control apparatus 23 are routed with respect to each of users, and then the routed ATM cells are transmitted to other switching stations and a gate station 25.

Such ATM cells may be merely transferred within the transfer path in response to occurrences of these ATM cells. Therefore, since the transfer paths used for the predetermined channels in the conventional communication system are no longer required, the statistical multiplexing effect can be achieved to utilize the transfer paths in a high efficiency in the CDMA communication system of the present invention. It should be understood that the above-explained gate station 25 is employed so as to relay an ATM cell to another network.

Internal Arrangement of Mobile Station

Figure 3:
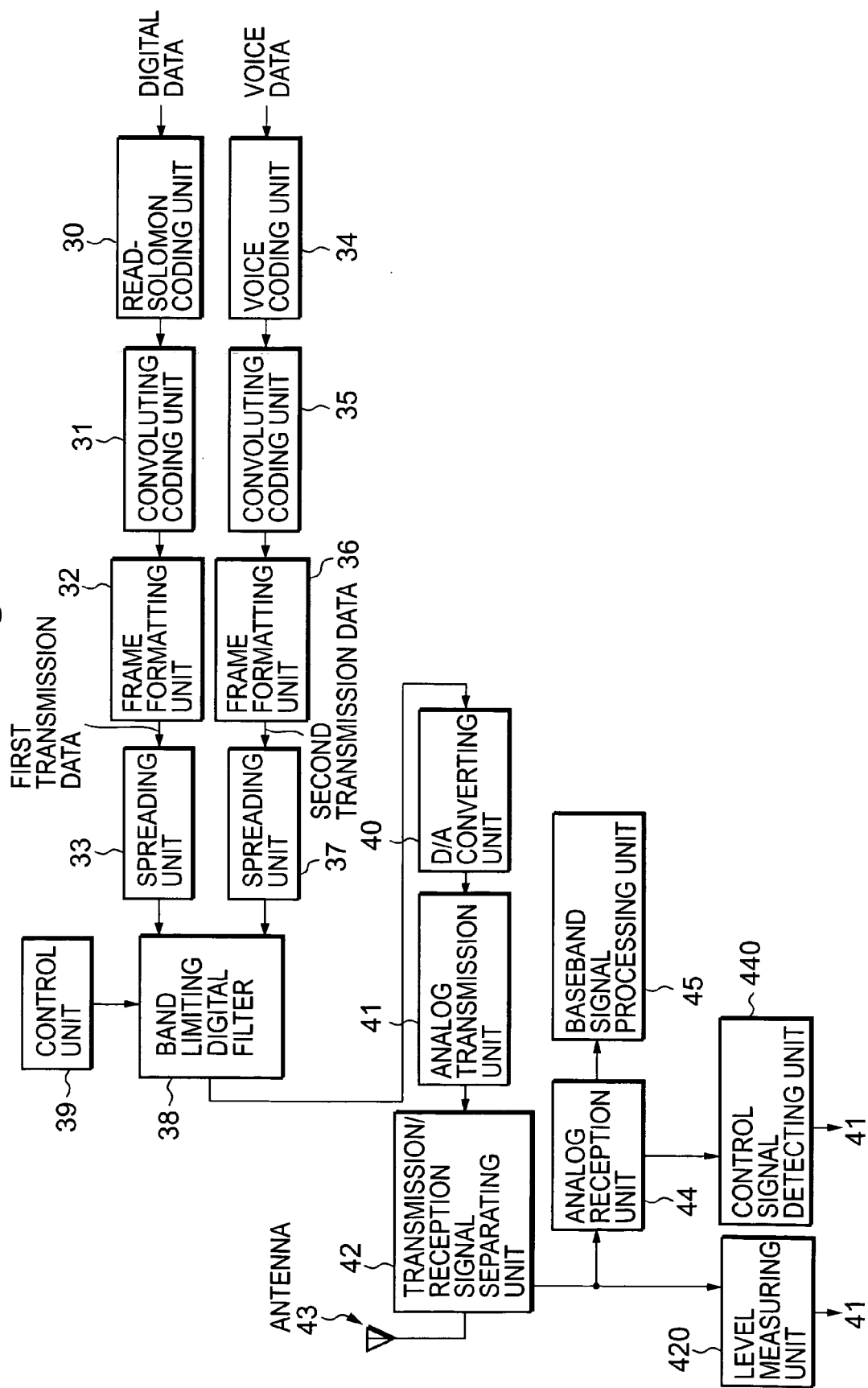
FIG. 3 is a schematic block diagram for representing a mobile station according to an embodiment of the present invention.

FIG. 3 is a schematic block diagram for representing an internal arrangement of a mobile station according to an embodiment of the present invention.

As shown in FIG. 3, the mobile station 21 is constructed of a first transmission data system and a second transmission data system. The mobile station 21 includes as the first transmission data system a Reed-Solomon coding unit 30 for Reed-Solomon-coding digital data entered from an input unit (not shown); a convolution coding unit 31 for convolution-coding the output data of the Reed-Solomon coding unit 30; a frame formatting unit 32 for formatting the output data of the convolution coding unit 31 to form a frame structure adapted to the CDMA communication; and a spreading unit 33 for spreading first transmission data, namely the output data of the frame formatting unit 32 by way of a preselected spreading code. Also, the mobile station 21 includes as the second transmission data system a voice coding unit 34 for coding voice (speech) data entered from an input unit (not shown either); a convolution coding unit 35 for convolution-coding the output data of the voice coding unit 34; a frame formatting unit 36 for formatting the output data of the convolution coding unit 35 to form a frame structure adapted to the CDMA communication; and a spreading unit 37 for spreading second transmission data, namely the output data of the frame formatting unit 36 by way of a preselected spreading code.

Furthermore, this mobile station 21 includes a band-limiting digital filter 38 for synthesizing the output data of the spreading unit 33 with the output data of the spreading unit 37; a control unit 39 for controlling the operation of the band-limiting digital filter 38; a D/A converting unit 40 for converting the output data (digital value) of the band-limiting digital filter 38 into an analog output value; an analog transmitting unit 41 for processing the analog output data of the D/A converting unit 40, for instance, modulating process, so as to convert this analog output signal into a wireless signal, and further for controlling transmission power; a transmission/reception signal separating unit 42 for separating a transmission signal from a reception signal; and an antenna 43 for transmitting the transmission signal derived from the transmission/reception signal separating unit 42, and also for receiving an electromagnetic wave signal sent from the base station 22. The above-explained structural elements constitute the transmission side of the mobile station 21. On the other hand, a reception side of this mobile station 21 is arranged as follows. That is, the mobile station 21 contains an analog reception unit 44 for processing a reception signal, for example, demodulating process, which is received by the antenna 43, and then is separated by the transmission/reception signal separating unit 42; and a baseband signal processing unit 45 for executing such a process operation to the analog output signal of the analog reception unit 44 to be returned to a baseband signal. In addition, the mobile station 21 contains a level measuring unit 420 for measuring a signal level of the reception signal separated by the transmission/reception signal separating unit 42, or measuring a signal quality thereof, for example Bit Error Ratio (BER); and a control signal detecting unit 440 for detecting a control signal used to instruct transmission power of the mobile station 21 transmitted from the base station based upon the signal demodulated by the analog reception unit 44. The above-explained analog transmission unit 41 controls the transmission power of the mobile station 21 in response to the output signals derived from the level measuring unit 420 and/or the control signal detecting unit 440, in other words, the level of the reception signal and/or the transmission power instruction issued from the base station.

In the embodiment indicated in FIG. 3, since both the digital data and the voice data are spread by using the different spreading codes from each other, both this digital data and this voice data are transmitted at the substantially same time.

It should be understood that since the structural arrangements of the reception side of the mobile station 21 do not constitute a major subject of the present invention, the overall arrangement thereof is represented in a simple manner.

Although not shown in FIG. 3, as to the digital data, this data may be interleave-processed.

This interleave process operation implies such a process operation that either digital data or voice data is subdivided into data groups in a preselected unit, these data groups are rearranged by each other in accordance with a predetermined rule to vary a data sequence, and then the data groups are transmitted in this changed sequence, which can prevent a burst error.

For example, in the case of the digital data entered into the Reed-Solomon coding unit 30 shown in FIG. 3, the digital data is grouped in the unit of 8-bit symbol, or 16-bit symbol before, or after being processed by the Reed-Solomon coding unit 30. The grouped data are rearranged by each other, namely the symbol interleave process may be carried out. Alternatively, the digital data is grouped in the unit of 1 bit before, or after being processed by the convolution coding unit 31. The grouped data are rearranged by each other, namely the bit interleave process may be carried out.

It should also be noted that the executions of these Reed-Solomon coding operation, convolution coding operation, and interleaving process operation may be properly selected, depending upon an environment of a communication system, and a state of required communication quality.

For the sake of easy observation, although not shown in FIG. 3, the control unit 39 also controls the operations of the respective circuit blocks of FIG. 3.

Figure 4:
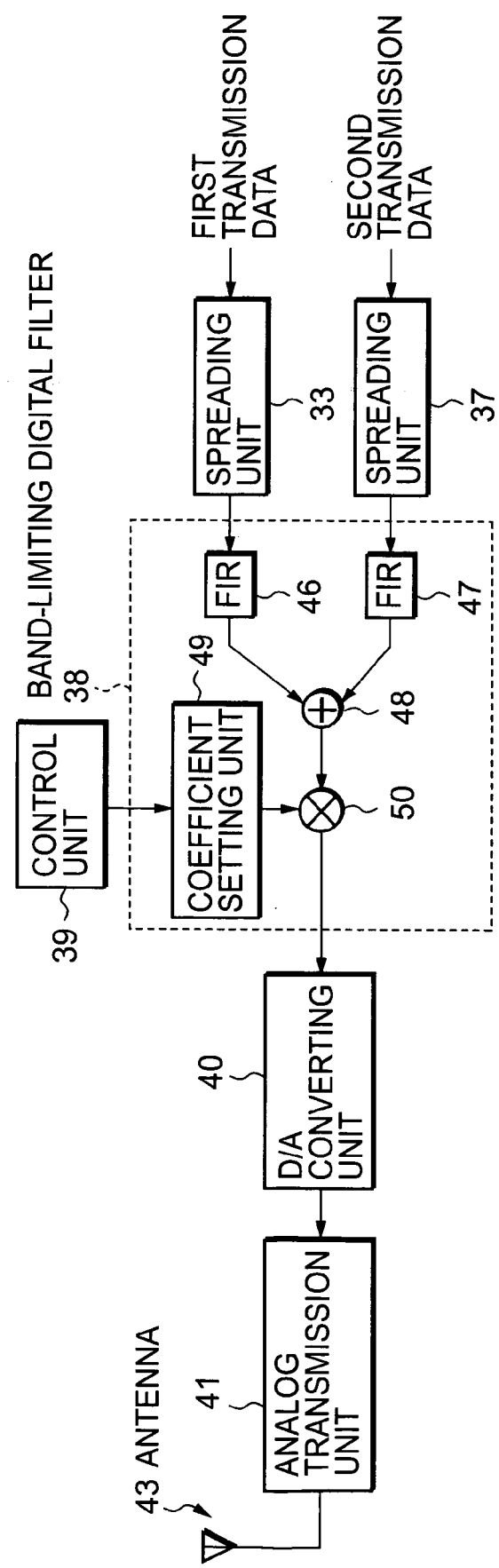
FIG. 4 is a schematic block diagram for indicating an arrangement of a band-limiting digital filter shown in FIG. 3.

FIG. 4 is a schematic block diagram for representing an internal arrangement of the band-limiting digital filter 38 shown in FIG. 3. It should be noted that the same reference numerals shown in FIG. 3 will be employed as those for indicating the same, or similar structural elements of FIG. 4.

As indicated in FIG. 4, the band-limiting digital filter 38 is arranged by employing an FIR (Finite Impulse Response) filter 46, another FIR filter 47, an adder 48, a coefficient setting unit 49, and a multiplying unit 50. The FIR filter 46 limits a frequency band of an output signal derived from the spreading unit 30 into a predetermined range. The FIR filter 47 limits a frequency band of an output signal derived from the spreading unit 37 into a predetermined range. The adder 48 adds the output signal filtered from the FIR filter 46 to the output signal filtered from the FIR filter 47. The coefficient setting unit 49 outputs a predetermined coefficient at such timing designated by the control unit 39. The multiplying unit 50 multiplies the output signal from the adder 48 by a predetermined coefficient outputted from the coefficient setting unit 49. In this case, the functions of both the FIR filter 46 and the FIR filter 47 are to produce waveforms in order that interference never occurs among codes.

Also, in FIG. 4, both the transmission/reception signal separating unit 42 and the reception circuit block, which are shown in FIG. 3, are omitted.

The multiplying unit 50 shown in FIG. 4 multiplies the amplitude of the output signal of the adder 48 by the predetermined coefficient outputted from the coefficient setting unit 49.

Structures of Transmission Data

Figure 5:
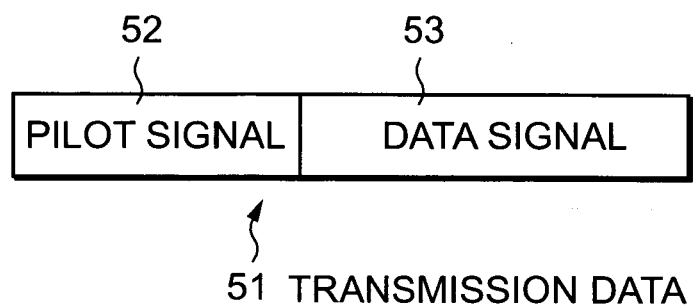
FIG. 5 is an illustration for showing an example of data structures of first transmission data and second transmission data indicated in FIG. 4.

FIG. 5 illustratively shows a structure of the first transmission data and also a structure of the second transmission data, indicated in FIG. 4.

In this embodiment, both the first transmission data and the second transmission data shown in FIG. 4 own a structure of transmission data 51 indicated in FIG. 5. As represented in FIG. 4, the transmission data 51 is constructed of a pilot signal 52 and a data signal 53.

The pilot signal corresponds to the known signal used to establish a synchronization. The same pilot signal is used in both the first transmission data and the second transmission data. The data signal 53 is arranged by such a signal that is actually wanted to be transmitted by a user. The content of the data signal for constituting the first transmission data is different from that of the second transmission data.

In other words, in the embodiment of FIG. 3, the data signal 53 of the first transmission data is the coded digital data outputted from the convolution coding unit 31, whereas the data signal 53 of the second transmission data is the coded voice data outputted from the convolution coding unit 35.

Figure 6:
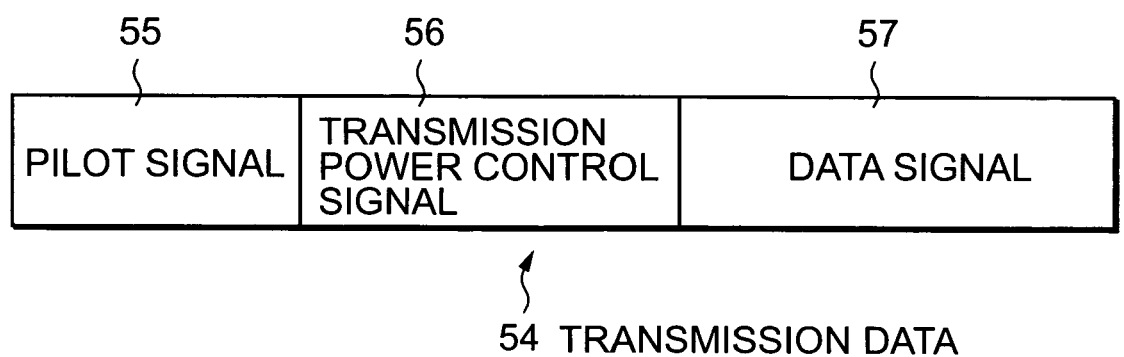
FIG. 6 is an illustration for showing another example of data structures of first transmission data and second transmission data indicated in FIG. 4.

FIG. 6 illustratively shows another example of the structures of both the first transmission data and the second transmission data shown in FIG. 4, which is different from the data structure shown in FIG. 5.

In this example, transmission data 54 is constituted by a pilot signal 55, a transmission power control signal 56, and a data signal 57. Both the pilot signal 55 and the data signal 57 are similar to those represented in FIG. 5.

Also, the transmission power control signal 56 is called as Transmitter Power Control (TPC), and corresponds to a signal used to notify a power level of a signal received from the base station 22 by the mobile station 21 to this base station 22. In response to the notification made by the transmission power control signal 56, the base station 22 controls a transmission power level of a signal transmitted from the own base station 22.

In such a case that a mobile station transmits a plurality of transmission data at the substantially same by using the multi-code, when the transmission data contains the transmission power control signal 56 as shown in FIG. 6, the transmission power control portion can be spread by way of the spreading code commonly used for a plurality of transmission data and the spread transmission power control signal can be transmitted similar to the pilot signal portion. This can be realized in such a case that the transmission power control signal 56 is the same control signal that is commonly used for a plurality of transmission data. As a result, in this case, the transmission power control signal portion may be handled in a similar manner to the pilot signal portion.

For the sake of easy explanations in the below-mentioned description, both the first transmission data and the second transmission data shown in FIG. 4 own the data structures illustrated in FIG. 5.

Figure 7:
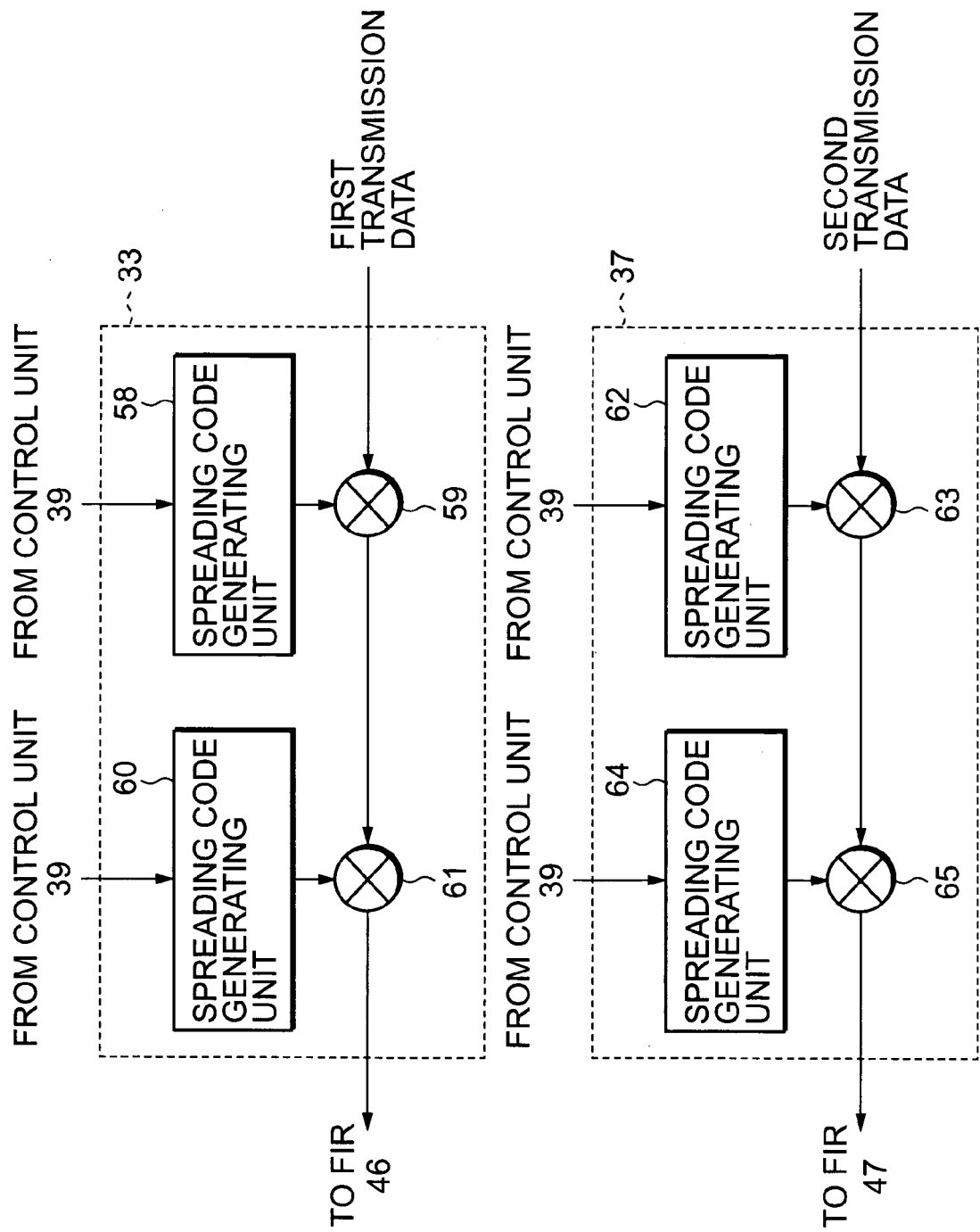
FIG. 7A and FIG. 7B are schematic block diagrams for showing an arrangement of a spreading unit shown in FIG. 4, according to an embodiment of the present invention.

FIG. 7A and FIG. 7B are schematic block diagrams for indicating internal arrangements of both the spreading unit 33 and the spreading unit 37 shown in FIG. 4.

As indicated in FIG. 7A, the spreading unit 33 is arranged by a spreading code generating unit 58, a multiplier 59, another spreading code generating unit 60, and another multiplier 61. The first-mentioned spreading code generating unit 58 generates a predetermined spreading code. The first-mentioned multiplier 59 multiplies the first transmission data shown in FIG. 4 by the spreading code generated by the spreading code generating unit 58. The second-mentioned spreading code generating unit 60 generates a preselected spreading code. The second mentioned multiplier 61 multiplies the output of the multiplier 59 by the spreading code generated by the spreading code generating unit 60.

Both the spreading code generating unit 58 and the multiplier 59 are employed so as to spread the data signal portion of the first transmission data, whereas both the spreading code generating unit 60 and the multiplier 61 are employed so as to spread the pilot signal portion of the first transmission data.

The generation timing of the spreading codes generated from both the spreading code generating units 58 and 60 of the spreading unit 33 is controlled by the control unit 39 shown in FIG. 3.

On the other hand, as indicated in FIG. 7B, the spreading unit 37 is arranged by a spreading code generating unit 62, a multiplier 63, another spreading code generating unit 64, and another multiplier 65. The first-mentioned spreading code generating unit 62 generates a predetermined spreading code. The first-mentioned multiplier 63 multiples the second transmission data shown in FIG. 4 by the spreading code generated by the spreading code generating unit 62. The second-mentioned spreading code generating unit 64 generates a preselected spreading code. The second mentioned multiplier 65 multiplies the output of the multiplier 63 by the spreading code generated by the spreading code generating unit 64.

Both the spreading code generating unit 62 and the multiplier 63 are employed so as to spread the data signal portion of the second transmission data, whereas both the spreading code generating unit 64 and the multiplier 65 are employed so as to spread the pilot signal portion of the second transmission data.

The generation timing of the spreading codes generated from both the spreading code generating units 62 and 64 of the spreading unit 37 is controlled by the control unit 39 shown in FIG. 3.

FIG. 8A to FIG. 8F are timing charts for representing the first transmission data, the second transmission data, the generation timing of the spreading code generated by the spreading code generating unit 58, the generation timing of the spreading code generated by the spreading code generating unit 60, the generation timing of the spreading code generated by the spreading code generating unit 62, and the generation timing of the spreading code generated by the spreading code generating unit 64.

It should be understood that the spreading codes generated from both the spreading code generating unit 60 and the spreading code generating unit 64 are identical to each other, and will be referred to as a "first spreading code" hereinafter. The spreading code generated from the spreading code generating unit 58 corresponds to such a spreading code having a small mutual correlation with the first spreading code, and will be referred to as a "second spreading code" hereinafter. The spreading code generated from the spreading code generating unit 62 corresponds to such a spreading code having a small mutual correlation with the first spreading code and also the second spreading code, and will be referred to as a "third spreading code" hereinafter.

As represented in FIG. 8A to FIG. 8F, the spreading code generating unit 58 generates the second spreading code at the timing of the data signal of the first transmission data, whereas the spreading code generating unit 60 generates the first spreading code at the timing of the pilot signal portion of the first transmission data. Also, the spreading code generating unit 62 generates the third spreading code at the timing of the data signal of the second transmission data, whereas the spreading code generating unit 64 generates the first spreading code at the timing of the pilot signal portion of the second transmission data.

Operation of CDMA Mobile Communication System

Referring now to drawings, operation of the CDMA mobile communication system according to this embodiment will be described.

Referring to FIG. 3, digital data is coded by the Reed-Solomon code in the Reed-Solomon coding unit 30, and thereafter is convoluted by the convolution code in the convolution coding unit 31. Then, the convolution-coded digital data is processed by the frame formatting unit 32 to produce the first transmission data which will be transmitted. Also, voice data is sampled and coded by the voice coding unit 34, and thereafter is convoluted by the convolution code in the convolution coding unit 35. Then, the convolution-coded voice data is processed by the frame formatting unit 36 to produce the second transmission data which will be transmitted.

With reference to FIG. 4, the first transmission data outputted from the frame formatting unit 32 is spread by the spreading unit 33 shown in FIG. 7A, and the second transmission data outputted from the frame formatting unit 36 is spread by the spreading unit 37 shown in FIG. 7B.

Both the output of the spreading unit 33 and the output of the spreading unit 37 are processed by the waveform generation in the FIR filter 46 and the FIR filter 47, respectively, in order that no interference occurs among the codes. Thereafter, the processed outputs are added to each other by the adder 48.

Figure 9:
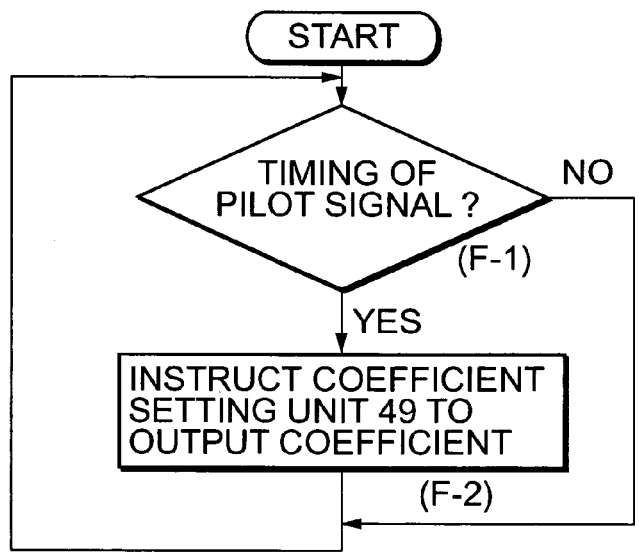
FIG. 9 is a flow chart for describing a coefficient instructing process operation executed by a control unit indicated in FIG. 4.

FIG. 9 is a flow chart for describing a coefficient instruction processing operation executed by the control unit 39 shown in FIG. 4.

Figure 10:
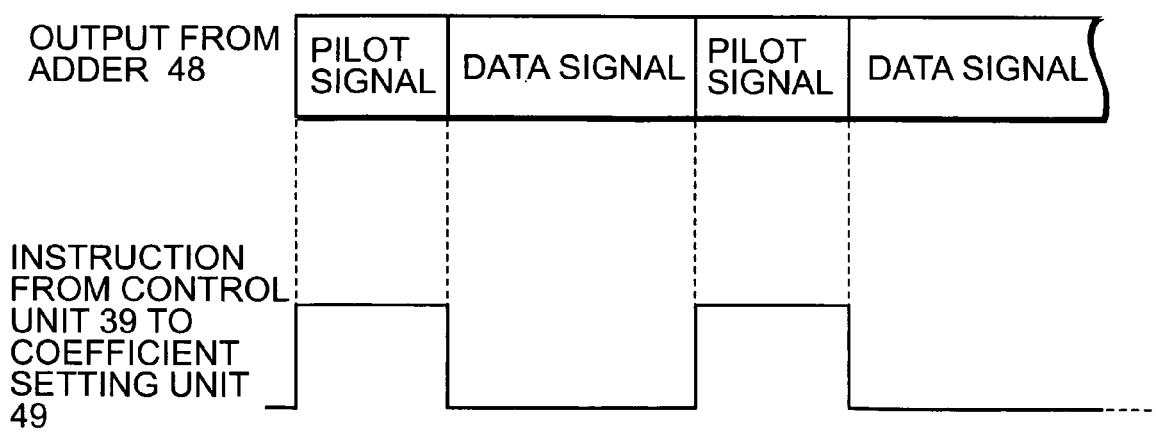
FIG. 10 is a timing chart for representing outputs of an adder shown in FIG. 4, and instruction timing issued from the control unit to a coefficient setting unit.

FIG. 10 is a timing chart for showing the output signal from the adder 48 shown in FIG. 4, and also instruction timing for outputting the coefficient from the control unit 39 to the coefficient setting unit 49.

The coefficient instruction processing operation will now be explained with reference to FIG. 9. First, the control unit 39 judges as to whether or not the present timing corresponds to such timing at which the pilot signal portion is presently transmitted (step F-1). When the present timing is not equal to the transmission timing of the pilot signal portion, no further process operation by the control unit 39 is carried out. To the contrary, when the present timing is equal to the transmission timing of the pilot signal portion, the control unit 39 instructs the coefficient setting unit 49 to output the coefficient (step F-2).

Referring now to FIG. 10, when the output signal of the adder 48 corresponds to the pilot signal portion, the instruction output signal from the control unit 39 to the coefficient setting unit 49 becomes a HIGH level signal, so that the control unit 39 instructs the coefficient setting unit 49 to output the coefficient.

In response to the instruction issued from the control unit 39, the coefficient setting unit 49 outputs the coefficient. To the contrary, when no coefficient output instruction is issued from the control unit 39, this coefficient setting unit 49 outputs a constant 1. The output of the coefficient setting unit 49 is multiplied by the output signal of the adder 48 in the multiplier 50. In other words, the output of the coefficient setting unit 49 is multiplied by the amplitude of the output signal of the adder 48, and the band-limiting digital filter 38 outputs the output signal of the multiplier 50 to an external circuit.

The digital output signal of the band-limiting digital filter 38 is converted into an analog signal by the D/A converting unit 40, and thereafter this analog signal is transmitted via the analog transmission unit 41 from the antenna 43.

Next, a description will now be made of a coefficient which is outputted from the coefficient setting unit 49 and is multiplied by the output signal of the adder 48.

As previously explained in the above-described formula (3), assuming now that a data stream of "N" pieces of transmission data is expressed as Dn(t)=(1, −1), a total power value of data signal portions becomes "N", whereas a total power value of pilot signal portions becomes $N^2$, wherein both "N" and "n" are an integer.

As a consequence, the coefficient setting unit 49 is required to output such a coefficient capable of canceling a power difference between this data signal portion and the pilot signal portion. Since a power value of a signal is equal to a squared amplitude value of the signal, as a coefficient to be multiplied by the amplitude of the signal, $1/\sqrt{N}$ is outputted as to the pilot signal portion, whereas as to the data signal portion, the constant 1 is outputted to the multiplier 50. By producing such a coefficient, it is possible to avoid unequals of the transmission power.

As indicated in FIG. 4, in accordance with this embodiment mode, since two sets of the above-explained first and second transmission data are transmitted at the substantially same time, the coefficient outputted from the coefficient setting unit 49 becomes $1/\sqrt{2}$.

Figure 8:
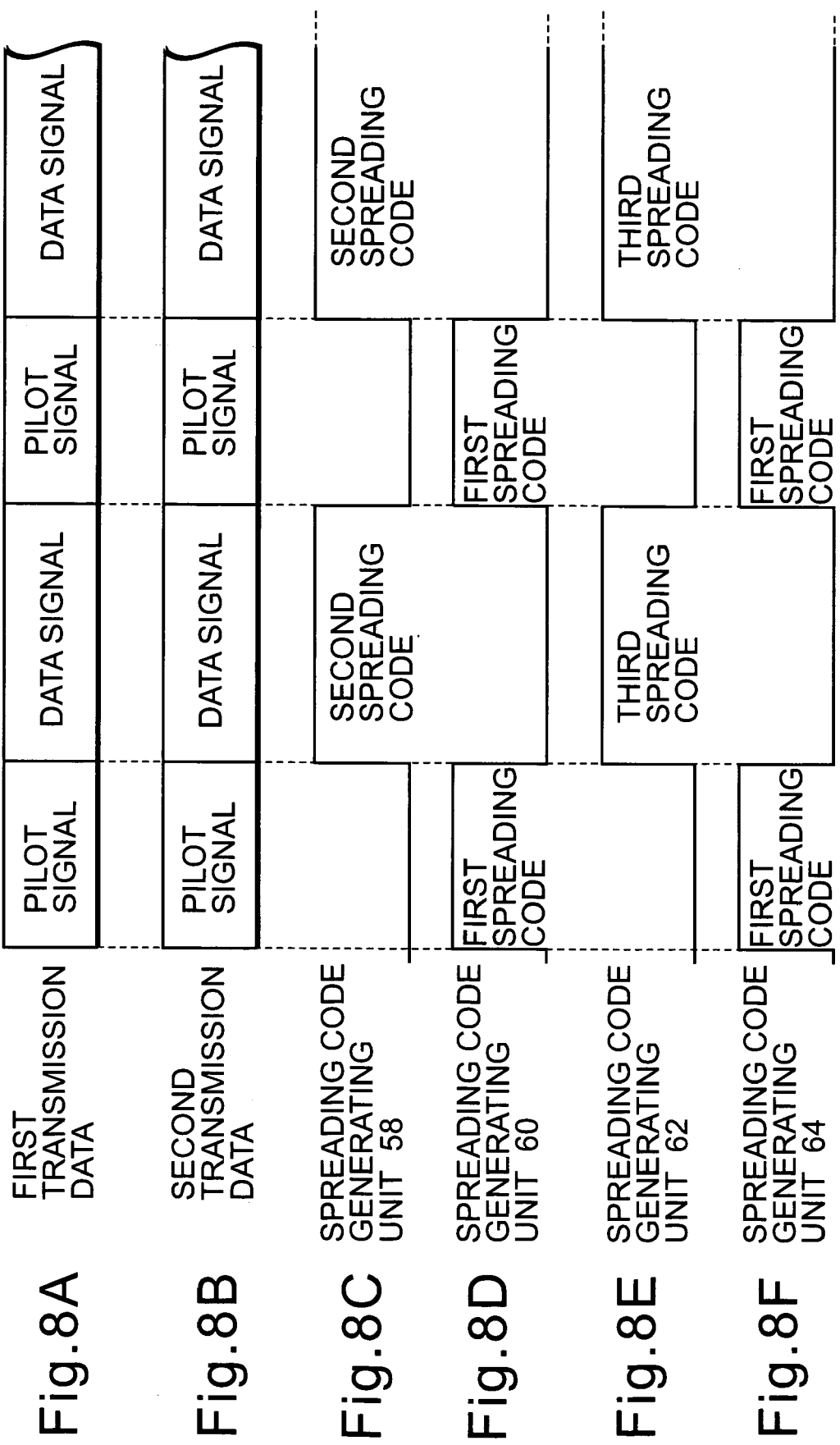
FIG. 8A to FIG. 8F are timing charts for representing generating timing of spreading codes generated by the respective spreading code generating units indicated in FIG. 7A and FIG. 7B, and also for representing the first transmission data and the second transmission data.

It should also be noted that although the pilot signal portion and the data signal portion of each of the transmission data are spread by employing the different spreading codes in the above-explained embodiment shown in FIG. 8, the present invention is not limited thereto. Other examples will be described as follows:

Other CDMA Mobile Communication Systems

FIG. 11A and FIG. 11B are schematic block diagrams for indicating internal arrangements of the spreading unit 33 and the spreading unit 37 shown in FIG. 4, which are different examples from that of FIG. 7A and FIG. 7B.

As indicated in FIG. 11A, the spreading unit 33 is arranged by a spreading code generating unit 66 for generating a predetermined spreading code, and a multiplier 67 for multiplying the first transmission data shown in FIG. 4 by the spreading code generated from the spreading code generating unit 66.

Both the spreading code generating unit 66 and the multiplier 67 are employed so as to spread the data signal portion and the data signal portion of the first transmission data, namely the entire portion of this first transmission data.

The generation timing of the spreading code from the spreading code generating unit 66 of the spreading unit 33 is controlled by the control unit 39 shown in FIG. 3.

On the other hand, as indicated in FIG. 11A, the spreading unit 37 is arranged by a spreading code generating unit 62, a multiplier 63, another spreading code generating unit 64, and another multiplier 65. The first-mentioned spreading code generating unit 62 generates a predetermined spreading code. The first-mentioned multiplier 63 multiplies the second transmission data shown in FIG. 4 by the spreading code generated by the spreading code generating unit 62. The second-mentioned spreading code generating unit 64 generates a preselected spreading code. The second mentioned multiplier 65 multiplies the output of the multiplier 63 by the spreading code generated by the spreading code generating unit 64.

Both the spreading code generating unit 62 and the multiplier 63 are employed so as to spread the pilot signal portion of the second transmission data, whereas both the spreading code generating unit 64 and the multiplier 65 are used so as to spread the pilot signal portion of the first transmission data.

The generation timing of the spreading codes from the spreading code generating units 62 and 64 of the spreading unit 37 is controlled by the control unit 39 shown in FIG. 3.

FIG. 12A to FIG. 12E are timing charts for representing the first transmission data, the second transmission data, the generation timing of the spreading code generated by the spreading code generating unit 66, the generation timing of the spreading code generated by the spreading code generating unit 62, and the generation timing of the spreading code generated by the spreading code generating unit 64 in the examples shown in FIG. 11A and FIG. 11B.

It should be understood that the spreading codes generated from both the spreading code generating unit 66 and the spreading code generating unit 64 are identical to each other, and will be referred to as a "first spreading code" hereinafter. The spreading code generated from the spreading code generating unit 62 corresponds to such a spreading code having a small mutual correlation with the first spreading code, and will be referred to as a "second spreading code" hereinafter.

As apparent from FIG. 12A to FIG. 12E, the spreading code generating unit 66 generates the first spreading code in the case that the first transmission data is present; the spreading code generating unit 62 generates the second spreading code at the timing of the data signal portion of the second transmission data; and the spreading code generating unit 64 generates the first spreading code at the timing of the pilot signal portion of the second transmission data.

In accordance with the example represented in FIG. 11A and FIG. 11B, and also FIG. 12A to FIG. 12E, there is such a merit that the spreading codes smaller than those of the example shown in FIG. 7A and FIG. 7B, and also FIG. 8A to FIG. 8F may be employed.

Next, a description will now be made of another embodiment of the present invention, different from the above embodiment of FIG. 3.

FIG. 13 is a schematic block diagram for showing another embodiment of the mobile station 21 according to the present invention. It should be noted that the same reference numerals shown in FIG. 3 will be employed as those for denoting the same, or similar circuits of FIG. 13.

In the above-described embodiment shown in FIG. 3, the mobile communication system is arranged in such a manner that one piece of the digital data and one piece of the voice data are transmitted, respectively. However, the present invention is not limited to this embodiment, but may be applied to such a communication system that a plurality of digital data and a plurality of voice data are transmitted.

As shown in FIG. 13, the mobile station 21 is arranged by a Reed-Solomon coding unit 30a for Reed-Solomon-coding digital data entered from an input unit (not shown); a convolution coding unit 31a for convolution-coding the output data of the Reed-Solomon coding unit 30a; a frame formatting unit 32a for formatting the output data of the convolution coding unit 31a to form a frame structure adapted to the CDMA communication; and a spreading unit 33a for spreading first transmission data, namely the output data of the frame formatting unit 32a by way of a preselected spreading code. Furthermore, the mobile station 21 contains a voice coding unit 34a for coding voice (speech) data entered from an input unit (not shown either); a convolution coding unit 35a for convolution-coding the output data of the voice coding unit 34a; a frame formatting unit 36a for formatting the output data of the convolution coding unit 35a to form a frame structure adapted to the CDMA communication; and a spreading unit 37a for spreading second transmission data, namely the output data of the frame formatting unit 36a by way of a preselected spreading code. In addition, the mobile station 21 contains Reed-Solomon coding unit 30b for Reed-Solomon-coding digital data entered from an input unit (not shown); a convolution coding unit 31b for convolution-coding the output data of the Reed-Solomon coding unit 30b; a frame formatting unit 32b for formatting the output data of the convolution coding unit 31b to form a frame structure adapted to the CDMA communication; and a spreading unit 33b for spreading an (N−1)-th transmission data, namely the output data of the frame formatting unit 32b by way of a preselected spreading code. Also, the mobile station 21 contains a voice coding unit 34b for coding voice (speech) data entered from an input unit (not shown either); a convolution coding unit 35b for convolution-coding the output data of the voice coding unit 34b; a frame formatting unit 36b for formatting the output data of the convolution coding unit 35b to form a frame structure adapted to the CDMA communication; and a spreading unit 37b for spreading an N-th transmission data, namely the output data of the frame formatting unit 36b by way of a preselected spreading code. In this case, symbol "N" indicates an integer larger than, or equal to 3. Furthermore, the mobile station 21 includes a band-limiting digital filter 38a for synthesizing the outputs of all of the spreading units 33a, 33b, 37a, 37b; a control unit 39 for controlling the operation of the band-limiting digital filter 38a; a D/A converting unit 40 for converting the output (digital value) of the band-limiting digital filter 38a into an analog output; an analog transmitting unit 41 for processing the analog output of the D/A converting unit 40, for instance, modulating process, so as to convert this analog output signal into a wireless signal, and further for controlling transmission power; a transmission/reception signal separating unit 42 for separating a transmission signal from a reception signal; and an antenna 43 for transmitting the signal derived from the transmission/reception signal separating unit 42, and also for receiving an electromagnetic wave signal sent from the base station 22. Also, the mobile station 21 contains an analog reception unit 44 for processing a reception signal, for example, demodulating process, which is received by the antenna 43, and then is separated by the transmission/reception signal separating unit 42; and a baseband signal processing unit 45 for executing such a process operation to the analog output signal of the analog reception unit 44 to be returned to a baseband signal.

It should also be understood that the embodiment shown in FIG. 13 corresponds to such a communication system that "N" pieces of digital data, and "N" pieces of voice data are transmitted in total, where "N" is an integer.

Figure 14:
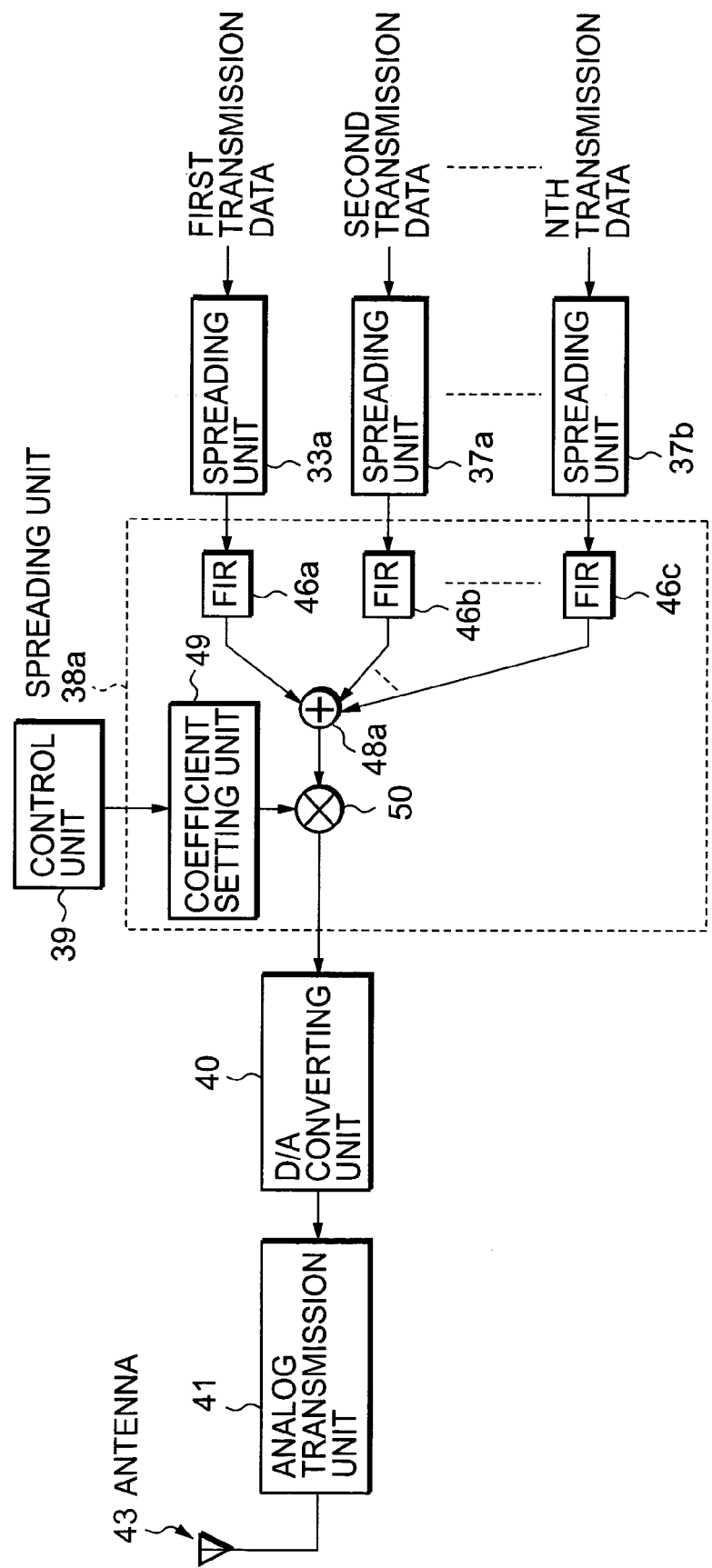
FIG. 14 is a schematic block diagram for indicating an arrangement of a band-limiting digital filter shown in FIG. 13.

FIG. 14 is a schematic block diagram for representing an internal arrangement of the band-limiting digital filter 38a shown in FIG. 13. It should be noted that the same reference numerals shown in FIG. 13 will be employed as those for indicating the same, or similar structural elements of FIG. 14.

As indicated in FIG. 14, the band-limiting digital filter 38a is arranged by employing an FIR (Finite Impulse Response) filter 46a, another FIR filter 46b, another FIR filter 46c, an adder 48a, a coefficient setting unit 49, and a multiplying unit 50. The FIR filter 46a limits a frequency band of an output signal derived from the spreading unit 33a into a predetermined range. The FIR filter 46b limits a frequency band of an output signal derived from the spreading unit 37a into a predetermined range. The FIR filter 46c limits a frequency band of an output signal derived from the spreading unit 37b into a predetermined range. The adder 48a adds the output signals filtered from all of the FIR filters 46a through 46c. The coefficient setting unit 49 outputs a predetermined coefficient at such timing designated by the control unit 39. The multiplying unit 50 multiplies the output signal from the adder 48a by a predetermined coefficient outputted from the coefficient setting unit 49. Since operation of this CDMA mobile communication system according to this embodiment is similar to that of the embodiment shown in FIG. 3, a detailed description thereof is omitted.

In accordance with this embodiment mode, since "N" pieces of transmission data defined from the first transmission data to the N-th transmission data are transmitted, the coefficient outputted from the coefficient setting unit 49 at the timing of the pilot signal portion may be selected to be $1/\sqrt{N}$.

Figure 16:
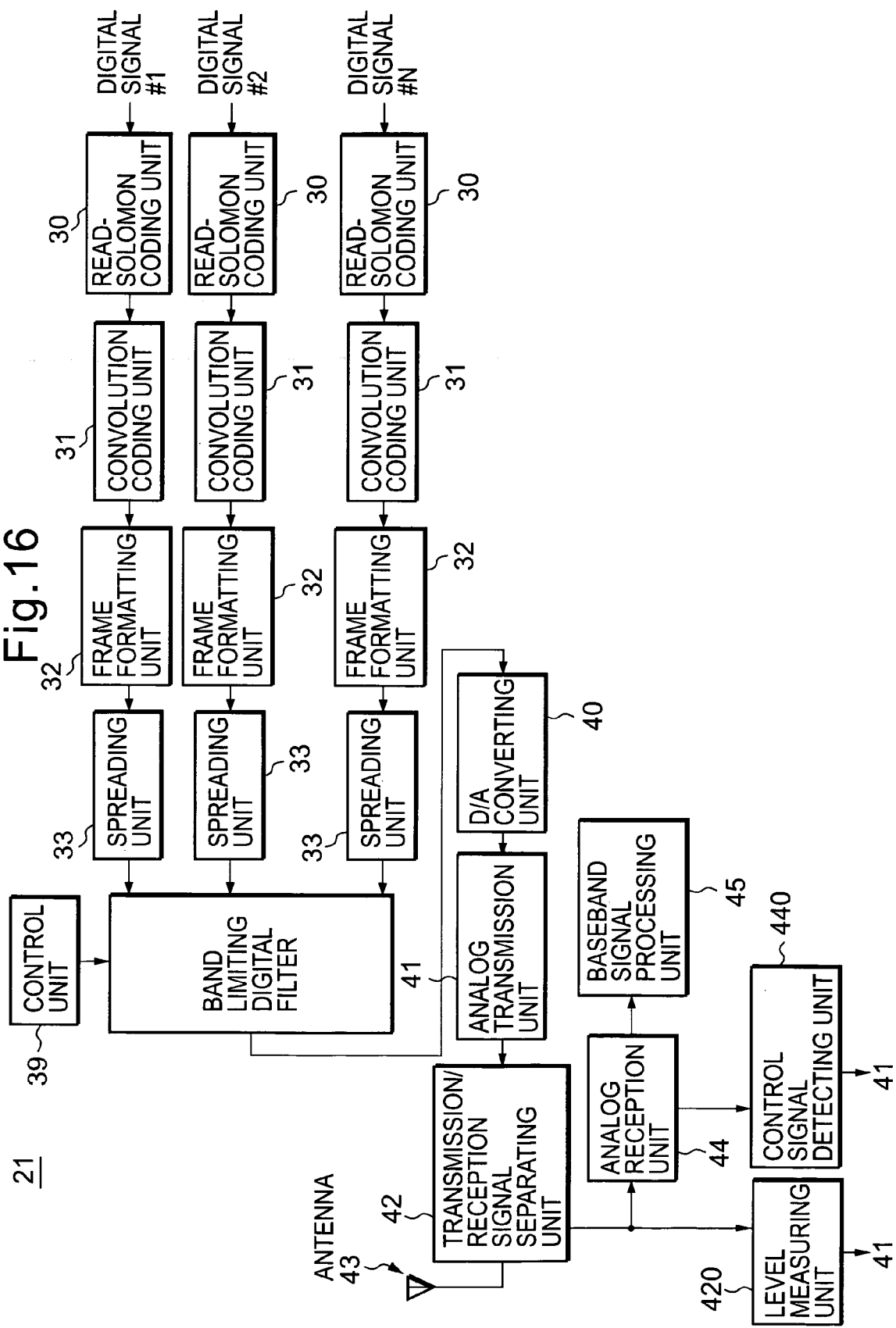
FIG. 16 is a schematic block diagram for representing a mobile station according to a further another embodiment of the present invention.

Referring now to FIG. 15A, FIG. 15B, and FIG. 16, a CDMA mobile communication system, according to further another embodiment of the present invention, will be explained. FIG. 15A and FIG. 15B are diagrams for indicating frame structures of transmission data. A series of transmission data is subdivided into "N" pieces of digital signals #1 to #N, wherein "N" is an integer. Each of these digital signals #1 to #N is arranged by a commonly used pilot signal, and data signals different from each other. FIG. 16 is a schematic block diagram for showing an arrangement of a mobile station 21 for transmitting the transmission data shown in FIG. 15A and FIG. 15B by way of a multi-code spreading manner. It should be understood that the same reference numerals shown in FIG. 3 will be employed as those for indicating the commonly used circuit elements in FIG. 16.

In accordance with the embodiment shown in FIG. 16, "N" pieces of digital signals #1 to #N which are obtained by subdividing a series of transmission signals are spreaded by using different spreading codes from each other, the respective digital signals are transmitted at the same time. In this case, each of the subdivided digital signals is constituted by a pilot signal portion, and different digital signal portions from each other. This pilot signal portion is commonly used in the respective digital signals. As a result, similar to the above-explained embodiment shown in FIG. 3, since the amplitude of the transmission power of the pilot signal portion is multiplied by a preselected coefficient, a difference between the transmission power of the pilot signal portion and the transmission power of the data signal portion can be canceled.

It should also be noted that although in the above-described embodiment modes, the present invention has been applied to the mobile stations in the mobile communication system, the present invention is not limited thereto. Alternatively, the present invention may be applied to other general-purpose communication apparatuses containing the base station.

Also, the technical idea of the present invention is not limited only to the CDMA communication system, but also to many other systems capable of controlling power of transmission data. Similarly, it is apparent that the coding method and the modulating method are not limited to the above-explained methods, but also to other methods.

As previously explained, in accordance with the present invention, since the amplitude value of the transmission power of the pilot signal portion of the transmission data is multiplied by a preselected coefficient, the difference between the transmission power of the pilot signal portion and the transmission power of the data signal portion can be reduced, preferably can be suppressed to nearly zero in the multi-code spread communication system.

As a consequence, even in such a case that the multi-code is used in the CDMA communication system, the transmission power can be kept constant. Therefore, it is possible to provide such a CDMA communication apparatus capable of realizing the CDMA communication under stable condition.

Obviously, numerous additional modifications and variations of the present invention are possible in light of the above teachings. It is, therefore, to be understood that within the scope of the appended claims, the invention may be practiced otherwise than as specifically described herein.

The invention claimed is:

1. A spread multi-code communication apparatus for transmitting a plurality of transmission data by spreading said plurality of transmission data by employing different codes from each other, comprising:
   a plurality of spreading units for spreading said plurality of transmission data by employing the different codes from each other to thereby output spread signals;
   a synthesizing unit for synthesizing a plurality of spread signals outputted from the respective spreading units with each other to thereby output a synthesized signal;
   a coefficient output unit for outputting a predetermined coefficient;
   a multiplying unit for multiplying the synthesized signal outputted from said synthesizing unit by said predetermined coefficient; and
   a transmitting unit for transmitting a signal outputted from said multiplying unit.

2. A spread multi-code communication apparatus as claimed in claim 1 wherein:
   each of said plural transmission data contains a pilot signal and a data signal.

3. A spread multi-code communication apparatus as claimed in claim 2 wherein:
   said coefficient output unit outputs said predetermined coefficient at a predetermined timing, in which a value of said coefficient has been set in such a manner that a transmission power of said pilot signal is made substantially equal to a transmission power of said data signal.

4. A spread multi-code communication apparatus as claimed in claim 3 wherein:
   said coefficient output unit outputs said coefficient to said multiplying unit when said pilot signal is outputted as said synthesized signal from said synthesizing unit.

5. A spread multi-code communication apparatus as claimed in claim 1 wherein:
   at least one of said plural transmission data contains digital data for a data communication purpose, and at least one of said plural transmission data contains voice data for a voice communication purpose.

6. A spread multi-code communication apparatus as claimed in claim 1 wherein:
   said plurality of transmission data are produced by subdividing a series of transmission data into plural transmission data.

7. A Code Division Multiple Access (CDMA) communication apparatus in which, with respect to a plurality of transmission data, each having a data signal and a pilot signal, said pilot signal is spread by way of a first spreading code which is commonly used to the respective transmission data, said data signal is spread by way of second spreading codes which are different from each other as to the respective transmission data, and all of the spread transmission data are added to each other, whereby the added transmission data is transmitted, comprising:
   a transmission power control unit for controlling a transmission power of said transmission data in such a manner that a transmission power of said pilot signal is made substantially equal to a transmission power of said data signal; and
   a transmission unit for transmitting said transmission data by the transmission power controlled by said transmission power control unit.

8. A CDMA communication apparatus as claimed in claim 7 wherein:
   said transmission power control unit includes an adjusting unit for adjusting at least one of said transmission power of said pilot signal and said transmission power of said data signal.

9. A CDMA communication apparatus as claimed in claim 8 wherein:
   said adjusting unit attenuates the transmission power of said pilot signal so as to make the transmission power of said pilot signal substantially coincident with the transmission power of said data signal.

10. A CDMA communication apparatus as claimed in claim 9 wherein:
    said adjusting unit multiplies a value equal to the transmission power of said pilot signal by a predetermined coefficient so as to attenuate said transmission power of said pilot signal.

11. A CDMA communication apparatus as claimed in claim 10 wherein:
    said adjusting unit sets a value of said coefficient in accordance with the number of said plural transmission data.

12. A CDMA communication apparatus as claimed in claim 11 wherein:
    in the case that said plurality of transmission data are "N" pieces of transmission data in which the "N" indicates an integer, said adjusting unit sets the value of said coefficient value to $1/\sqrt{N}$.

13. A CDMA communication apparatus as claimed in claim 7 wherein:
    a spreading code for spreading at least one data signal among said second spreading codes is made coincident with said first spreading code for spreading the pilot signal.

14. A spread multi-code communication method for transmitting a plurality of transmission data by spreading said plurality of transmission data by employing different codes from each other, said method comprising:

spreading said plurality of transmission data by employing the different codes from each other to thereby output spread signals;

synthesizing said plurality of spread signals with each other to thereby output a synthesized signal;

outputting a predetermined coefficient;

multiplying the synthesized signal by said predetermined coefficient; and transmitting a signal outputted from said multiplying unit.

15. A spread multi-code communication method as claimed in claim 14 wherein:

each of said plural transmission data contains a pilot signal and a data signal.

16. A spread multi-code communication method as claimed in claim 14 wherein:

a value of said coefficient is set in such a manner that a transmission power of said pilot signal is made substantially equal to a transmission power of said data signal.

17. A spread multi-code communication method as claimed in claim 16 wherein:

said synthesized signal is multiplied by said coefficient at a timing when said synthesized signal is equal to said pilot signal.

18. A Code Division Multiple Access (CDMA) communication method in which, with respect to a plurality of transmission data, each having a data signal and a pilot signal, said pilot signal is spread by way of a first spreading code which is commonly used to the respective transmission data, said data signal is spread by way of second spreading codes which are different from each other as to the respective transmission data, and all of the spread transmission data are added to each other, whereby the added transmission data is transmitted, said method comprising:

controlling a transmission power of said transmission data in such a manner that a transmission power of said pilot signal is made substantially equal to a transmission power of said data signal; and transmitting said transmission data by a transmission power controlled by using a transmission power control unit.

19. A CDMA communication method as claimed in claim 18 wherein:

at least one of said transmission power of said pilot signal and said transmission power of said data signal is adjusted.

20. A CDMA communication method as claimed in claim 19 wherein:

the transmission power of said pilot signal is attenuated so as to make the transmission power of said pilot signal substantially coincident with the transmission power of said data signal.

21. A CDMA communication method as claimed in claim 20 wherein:

a value equal to the transmission power of said pilot signal is multiplied by a predetermined coefficient so as to attenuate said transmission power of this pilot signal.

22. A CDMA communication method as claimed in claim 21 wherein:

a value of said coefficient is set in accordance with the number of said plural transmission data.

23. A CDMA communication method as claimed in claim 22 wherein:

in the case that said plurality of transmission data are "N" pieces of transmission data in which the "N" indicates an integer, the value of said coefficient value to $1/\sqrt{N}$ is set.

* * * * *